J. R. PADDACK.
HAY RAKE AND GATHERER.
No. 175,738.  Patented April 4, 1876.
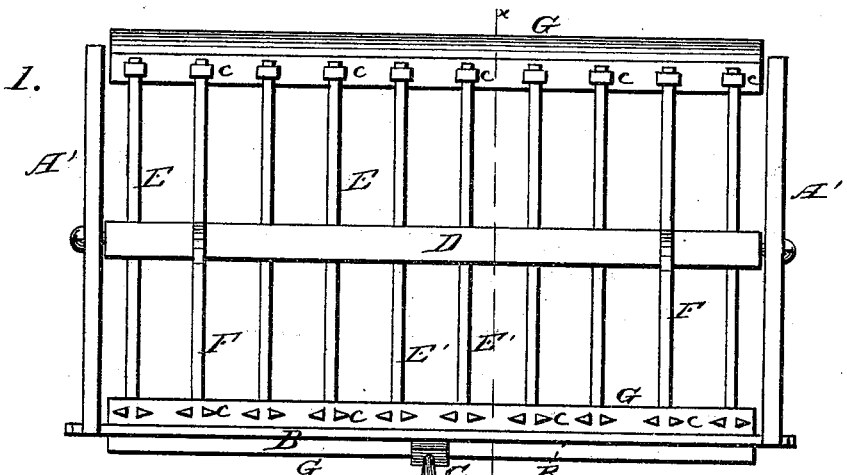
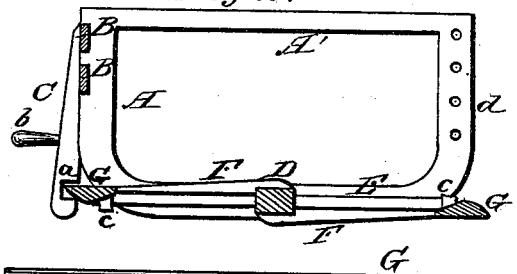
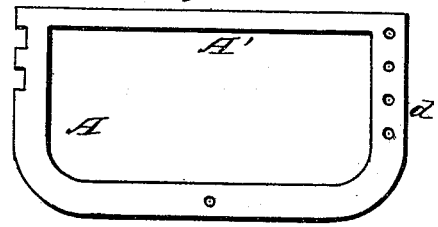
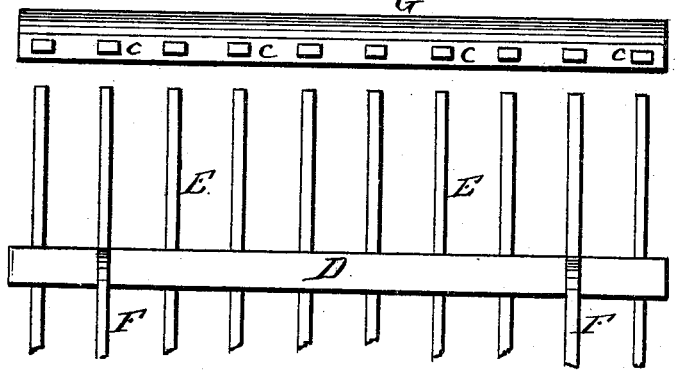
Witnesses:
L. L. Bond
O. W. Bond
Inventor:
James R. Paddack

UNITED STATES PATENT OFFICE.

JAMES R. PADDACK, OF CHICAGO, ILLINOIS.

IMPROVEMENT IN HAY RAKES AND GATHERERS.

Specification forming part of Letters Patent No. 175,738, dated April 4, 1876; application filed February 10, 1876.

*To all whom it may concern:*

Be it known that I, JAMES R. PADDACK, of the city of Chicago, in Cook county, State of Illinois, have invented certain new and useful Improvements in Combined Hay Rakes and Gatherers, of which the following is a full description, reference being had to the accompanying drawings, in which—

Figure 1 is a top or plan view; Fig. 2, a vertical cross-section; Fig. 3, an end view; and Fig. 4 a plan view, of a portion of the rake, showing the gathering-bar detached.

The object of my invention is to construct a horse-rake so that it can be used for forming windrows, bunching windrows, or for hauling hay to the stack or elsewhere; and its nature consists in pivoting or hanging a rake in a frame which will hold a considerable quantity; in providing the rake with detachable bars, and in providing the rake with runners.

In the drawings, A represents the curved portion of the frame; A', the upper cross-bars; B, rear cross-bars; C, lock or spring bar; D, rake-head; E, rake-teeth; F, runners; G, detachable gathering-bars; *a*, lock notch in the bar C; *b*, handle for withdrawing the bar C, to unlock the rake, and *c* sockets or staples for attaching the gathering-bars to the teeth.

In constructing the rake I make it chiefly of wood, and the length is made to vary from eight to fourteen feet, according as the rake is designed to be used with one or two horses. The lower corners of the frames A are curved or beveled off, so as to prevent catching in the ground or interfering with the operation of the rake. The rake-head is pivoted in or to them, as shown, and they are connected together by one or more cross-bars, B, at the rear. The rake-teeth E are inserted in or attached to the head in any of the usual or well-known methods, and their outer ends are, by preference, pointed flat, as shown, so as to properly take up loose hay, and also to fit into the sockets or staples *c* of the detachable bars G. The rake is also provided with runners F, which serve to keep the gathering-points in proper position, and also to serve as runners by slightly tipping the rake backward when they sustain its entire weight, and when in this position and filled with hay the rake can be used to convey the hay to the stack or elsewhere, as desired. The detachable bars G are beveled off at their outer edges, as shown, so as to pass below the hay, and are provided with staples or sockets *c*, which fit closely to the teeth, so as to hold the bars in place. Sockets *c* are shown for each tooth, which is preferable; but a less number of sockets may be used. The bar C may be made with a hinge and spring; but in practice it will be found to have sufficient spring or yield from its attachment at the middle of the bars B. When the bars G are in use the notch *a* of the bar C will furnish a sufficient lock; but when they are detached, then a short cross-bar, sufficiently long to engage with the teeth E', will be placed in the notch *a* to form the lock or stop, or any other suitable device may applied for that purpose.

In operation, a horse may be hitched to each of the frames A by means of the holes *d* for operating it by two horses, and ropes or other suitable device may be placed in said holes for operating it by one horse. When used for simply raking loose hay the bars G are detached. When the windrows are formed the bars G are attached, so as to give the rake the strength of all or nearly all of the teeth, and the windrow can be bunched, or it can be followed until the rake with its frame is filled full, when, by tipping it back slightly, the weight comes on the runners F, and it can be used as a sled for taking the hay to any desired place, and the rounded corners of the frame enable the operator to so tilt the frame as to ease its passage over obstacles when moving with a load.

It will be seen that the rake D E is a revolving rake, and in revolving it, it is unlocked, when it will revolve in the usual manner.

What I claim as new, and desire to secure by Letters Patent, is—

1. The detachable gathering-bars G, in combination with the rake D E, substantially as and for the purposes set forth.

2. The runners F, in combination with the rake D E, detachable bars G, frame A B, and lock C, substantially as described.

3. The runners F, in combination with the centrally-pivoted rake D E for giving the teeth a suitable pitch in raking, substantially as specified.

JAMES R. PADDACK.

Witnesses:
L. L. BOND,
J. B. HAMMOND.